United States Patent [19]

King

[11] 4,450,708
[45] May 29, 1984

[54] UNIVERSAL, ADJUSTABLE BENDING FORM FOR SHAPING ELECTRICAL WINDINGS

[75] Inventor: Joseph S. King, Marysville, Ohio

[73] Assignee: King Industrial Products Co., Inc., Columbus, Ohio

[21] Appl. No.: 390,217

[22] Filed: Jun. 21, 1982

[51] Int. Cl.³ .................... B21D 11/02; B21D 11/10
[52] U.S. Cl. .................................... 72/481; 72/295; 72/301
[58] Field of Search ............... 72/295, 293, 301, 302, 72/303, 299, 482, 481, 466, 465

[56] References Cited

U.S. PATENT DOCUMENTS

| | | | |
|---|---|---|---|
| 401,509 | 4/1889 | Mitchell | 72/465 |
| 1,741,840 | 12/1929 | Harmon et al. | 72/295 |
| 2,887,143 | 5/1959 | Ahonen | 72/303 |
| 3,043,361 | 7/1962 | Kelso | 72/482 |

FOREIGN PATENT DOCUMENTS

| | | | |
|---|---|---|---|
| 385984 | 3/1965 | Switzerland | 72/301 |
| 741991 | 7/1980 | U.S.S.R. | 72/482 |

Primary Examiner—Daniel C. Crane
Attorney, Agent, or Firm—Frank H. Foster

[57] ABSTRACT

An adjustable flexible form for shaping electrical windings is attached between two end supports. The flexible form can be arched by moving the end supports closest to one another. A twist can be imparted into the arched flexible form by rotation of one or both end supports. Intermediate supports can be adjusted against the form to provide rigidity. Both the selected arch and twist of the form are imparted into an object pulled down and across the form.

9 Claims, 7 Drawing Figures

UNIVERSAL, ADJUSTABLE BENDING FORM FOR SHAPING ELECTRICAL WINDINGS

TECHNICAL FIELD OF THE INVENTION

This invention relates to the manufacture of electrical coils or windings and more particularly relates to a bending form for shaping the end turns of the coils used in the windings of rotating electrical machinery such as motors and generators. This applies to both the original manufacturing and rewinding

BACKGROUND OF THE INVENTION

In the construction of electrical generators, motors and the like, slots are formed in the armature for receipt of the armature windings. When such machines are rebuilt the old windings are removed and must be replaced with new ones. Different designers and manufacturers construct their equipment in differing shapes and contours. Therefore, the new or replacement windings must be custom formed and shaped to fit into the geometry of each of the particular machines.

Conventionally and typically the windings are formed by first winding a conductor into a simple, multi-turn conductor loop. Several such multi-turn conductor loops or windings may be formed each to be subsequently custom shaped for placement in the slots in the ferromagnetic material of the machine.

After the simple loop is formed, it is positioned upon a coil spreader which supports the loop at its opposite ends by knuckles and on its sides by clamps and then spreads the side portions of the loop outwardly and downwardly pulling the loop down while spreading it and forming it into the desired shape. In order to properly shape the end turn portion of each coil into the curve shape which fits the geometry of the armature, conventional spreading machines require a properly contoured surface over which the end turn portions can be pulled to bend and form them.

One disadvantage of one type of prior art form surface is that a separate form must be custom made for each armature to provide the appropriate curvature. The custom fabrication of a different form for each armature in order to obtain the appropriate contour is expensive and inefficient.

One alternative suggested in the prior art is the provision of a plurality of semicircular discs of differing radii which may be positioned to approximately the desired contour for the end turn portion of each winding. This device, however, requires the maintenance of an inventory of semicircular discs and considerable manual labor in assemblying them into the appropriate contours.

Additionally, modern coils utilize modern insulation systems as their insulating material and modern coil design attempts to put a higher conductor cross sectional area in the coils. The resulting coils are stiffer but require forming to within narrower tolerances. Thus, for modern coil winding accuracy in forming of the coil has become considerably more critical. Additionally, modern insulation systems have better dielectic strengths. Therefore, thinner layers may be used which additionally increases the accuracy requirement. This requirement for custom forming of coils with greater accuracy creates a need for a coil bending form which is universal and has greater accuracy.

BRIEF SUMMARY OF THE INVENTION

The invention is a universal, adjustable, bending form which can be simply adjusted to the desired contour without the requirement of an inventory of interchangeable parts and without the requirement for custom construction of forms for each armature geometry. The bending form of the present invention has an elongated, flexible form sheet, preferably of spring steel, having an upper surface defining the form surface. End supports are spaced from each other and attached near the ends of the flexible form sheet. At least one of the end supports is angularly adjustable relative to the other end support so that one end of the form sheet may be adjustably twisted into a desired contour with respect to the other end of the form sheet.

Positioned between the end supports are intermediate supports for supporting the flexible form sheet between its ends. The intermediate supports are adjustable transversely of the sheet and angularly of the sheet so that they can be adjusted to support the sheet at a selected twist and curvature. Preferably, one end support is also adjustable toward and away from the other end support so that both the lateral twist and the longitudinal curvature may be adjusted to form the elongated flexible form sheet into the appropriate contour for forming the end turn portion of each coil.

It is therefore an object of the present invention to provide a single form which may be universally used for forming the involute curved shape of the end turn portion of each coil and which may be used during the normal coil spreading operation and yet which eliminates the need for custom manufactured forms or an inventory of interchangeable parts.

Figure 1:
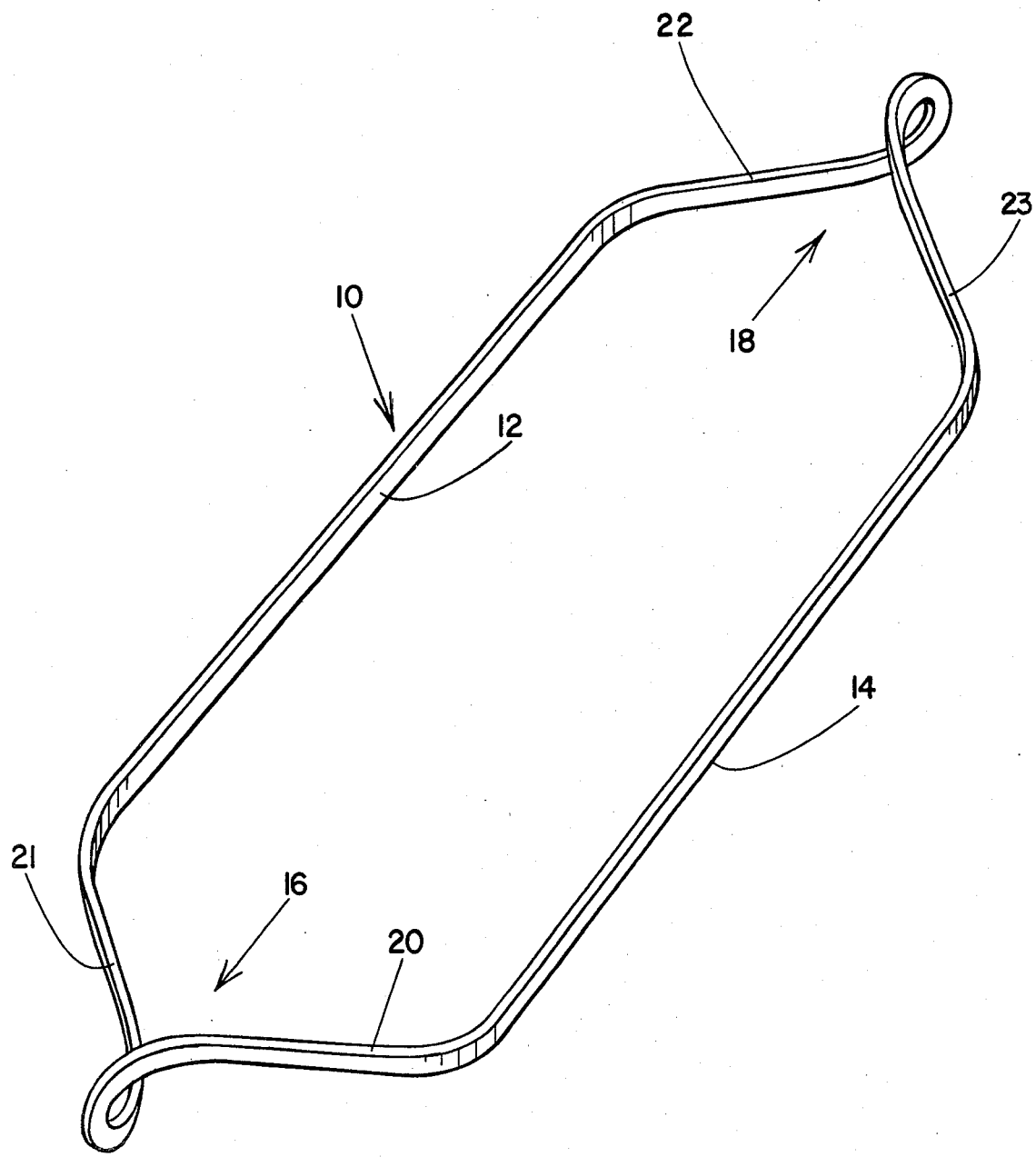
FIG. 1 is a view in perspective of a formed winding.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

FIG. 1 illustrates a finished winding 10. The winding 10 has two central, relatively linear portions 12 and 14 and two end turns 16 and 18. Each end turn 16 and 18 has a pair of complex, involute curve portions. For example, end turn 16 has curved portions 20 and 21 and end turn 18 has curved portions 22 and 23. It is the shaping of these curved end turn portions for which the present invention provides a form.

The curvature of these end turn portions varies from machine to machine. The curvature varies not only perpendicularly to the plane of the relatively linear portions 12 and 14 but also within that plane. Some ends are relatively elongated and pointy while other ends are relatively short and stubby.

Figure 2:
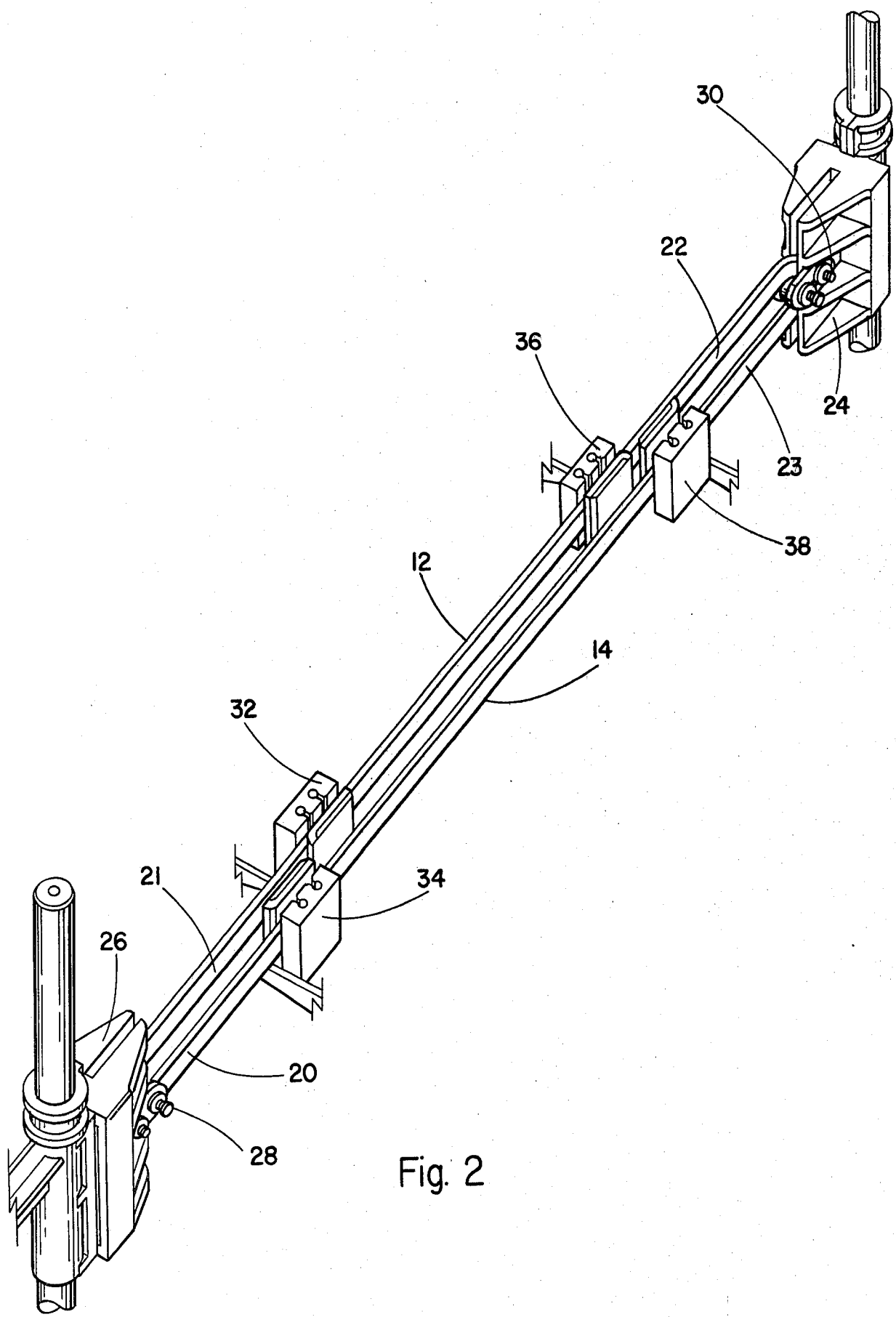
FIG. 2 is a diagramatic illustration of a simple coil positioned on a coil spreading machine prior to the spreading and forming operation.

FIG. 2 shows a simple loop coil 24 mounted on a coil spreading machine which is diagramatically illustrated. Because machines of this type are commercially available this one is not illustrated in detail. The coil spreading machine includes a knuckle holder 26, having a pin 28 extending through the end of the coil 24 and also having a similar knuckle holder 29, having a pin 30 at the opposite end of the loop 24.

Four clamps 32, 34, 36 and 38 are attached to the coil 24 for spreading the coil at the appropriate step in the manufacturing process. In the coil forming operation, the knuckle pins 28 and 30 may remain immobile or may move vertically or float. The four clamps 32–38 pull the coil laterally sidewardly and clamps 32 and 36 pull downwardly to spread apart the relatively linear portions 12 and 14 of the coil and simultaneously pull the end turn curved portions 20, 21, 22 and 23 against the forming surfaces positioned below and outwardly from the knuckles 26 and 29.

Figure 3:
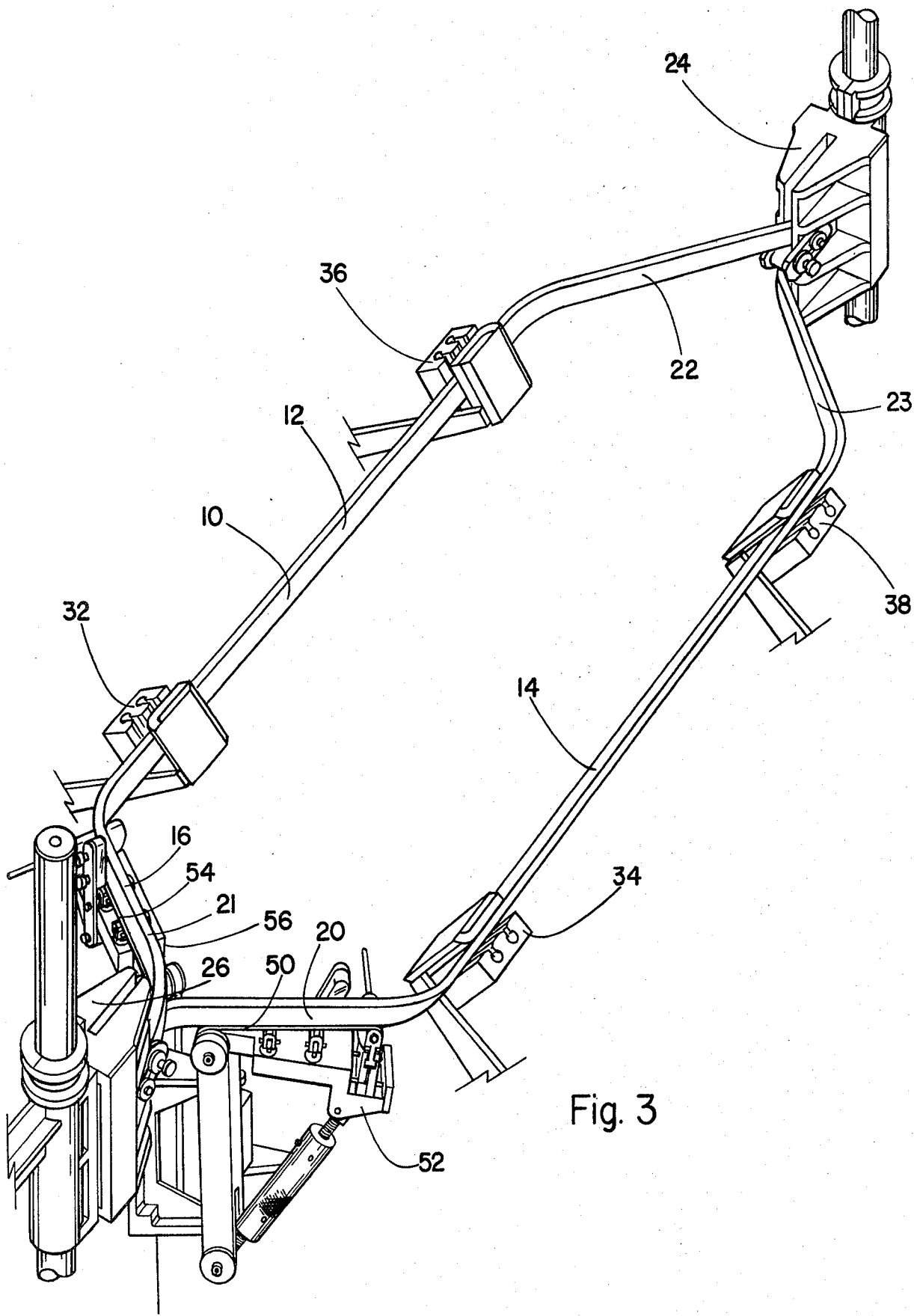
FIG. 3 is a view in perspective of the coil on the machine of FIG. 2 after it has been spread and formed.
Figure 4:
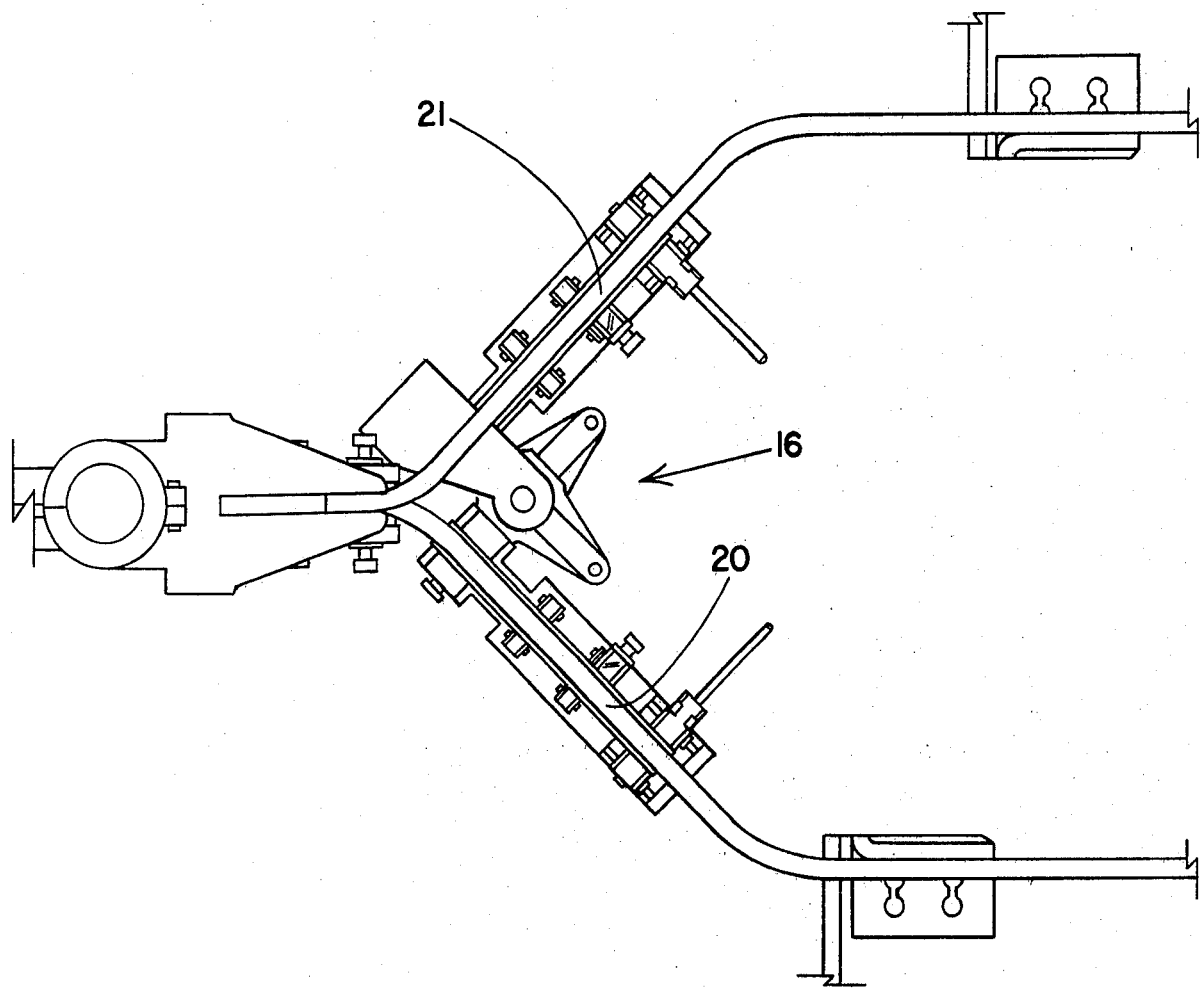
FIG. 4 is a top plan view of an end of the coil and machine illustrated in FIG. 2.

FIGS. 3 and 4 illustrate the spread coil 10 after having been pulled against the form surfaces for shaping the end turn curved portions 20, 21, 22 and 23. Each end turn curved portion is bent against a separate form embodying the present invention. Thus, end turn curved portion 20 is formed by the form surface 50 of bending form 52 and similarly end turn curved portion 21 is formed by the form surface 54 of bending form 56. End turn curved portion 22 and end turn curved portion 23 also are formed against the form surfaces of two additional and similarly positioned bending forms embodying the present invention located below the opposite end of the coil but not illustrated.

Figure 5:
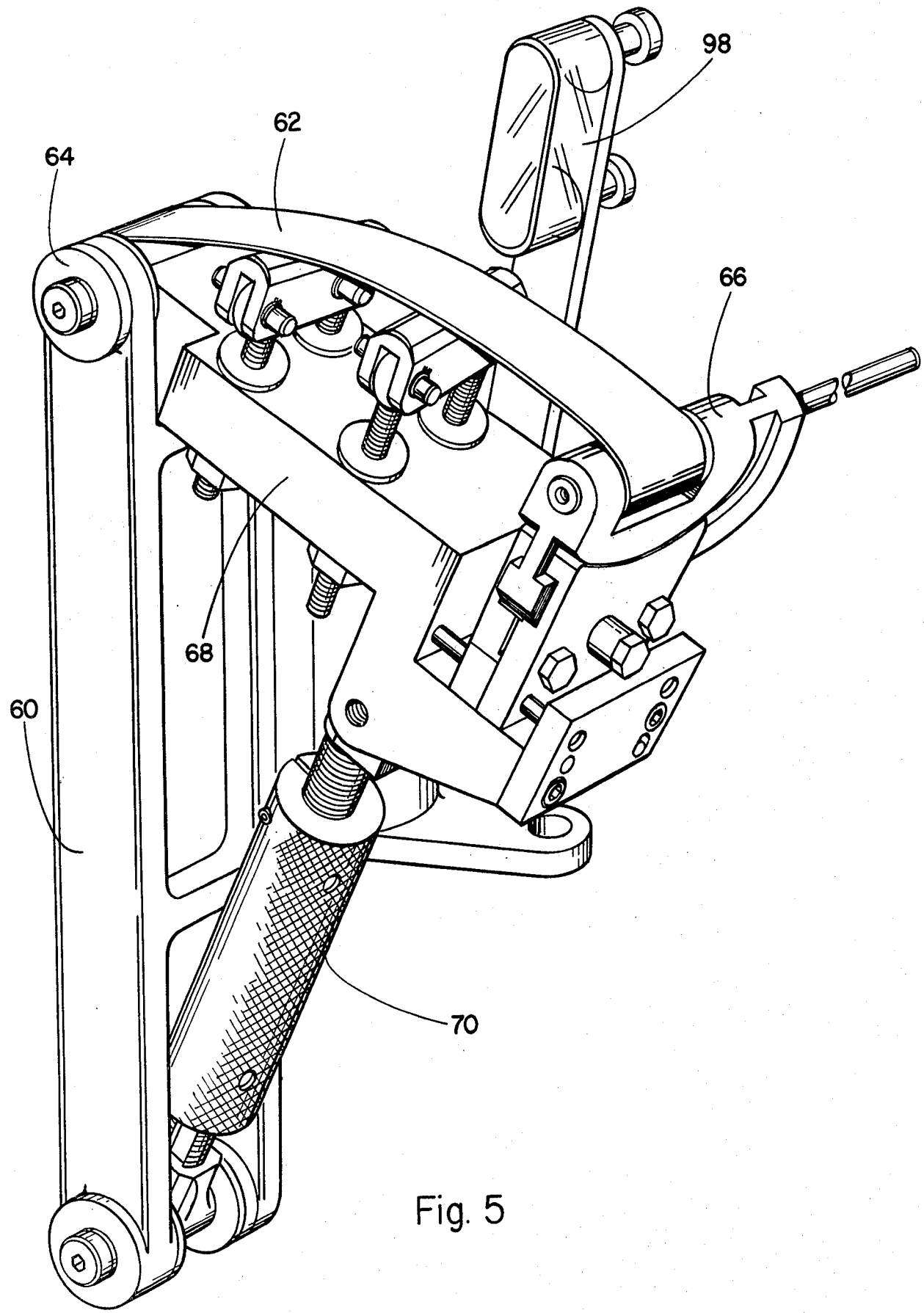
FIG. 5 is a view in perspective of the preferred embodiment of the invention.
Figure 6:
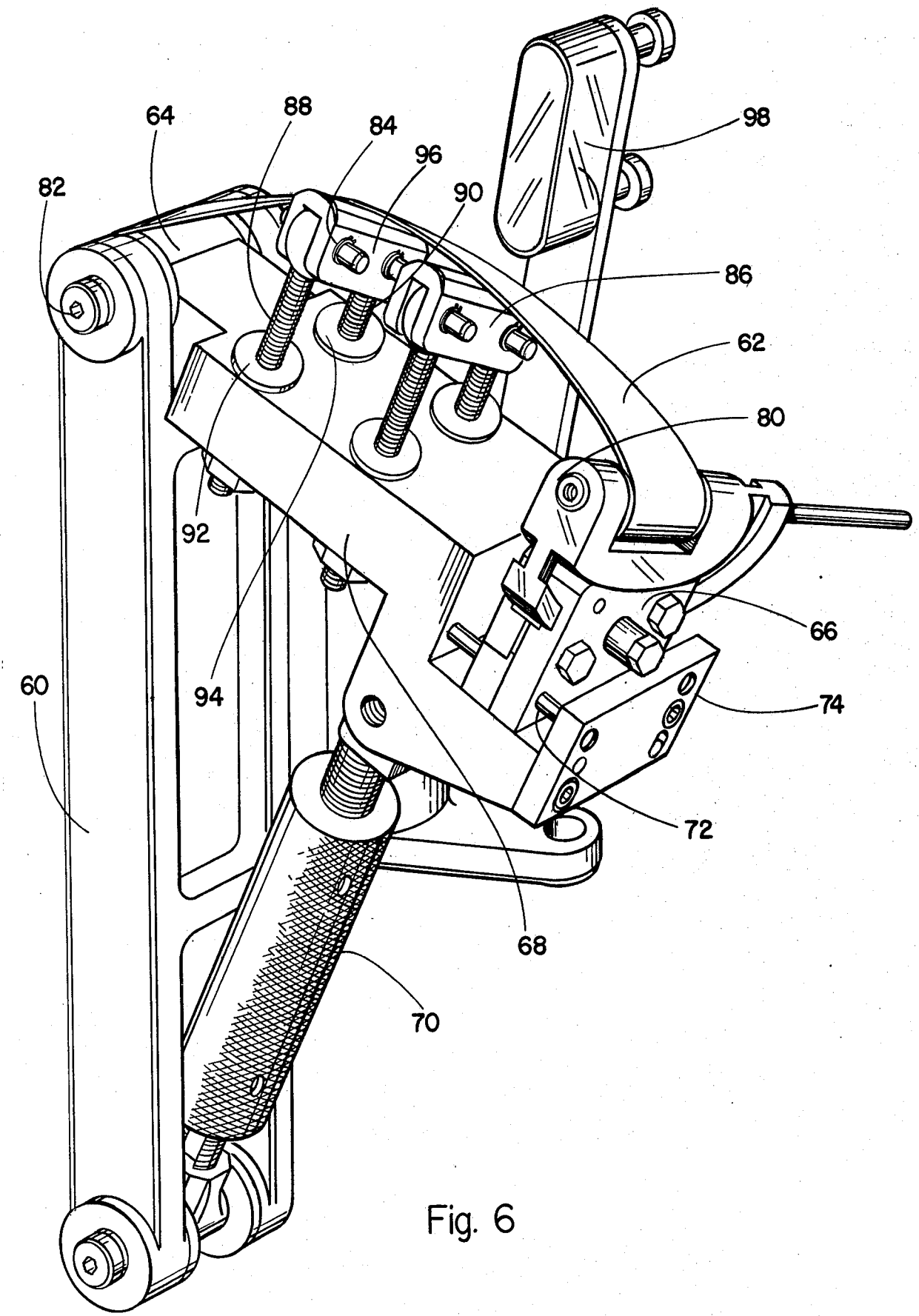
FIG. 6 is a view in perspective of the embodiment illustrated in FIG. 5 but formed with a substantial twist.
Figure 7:
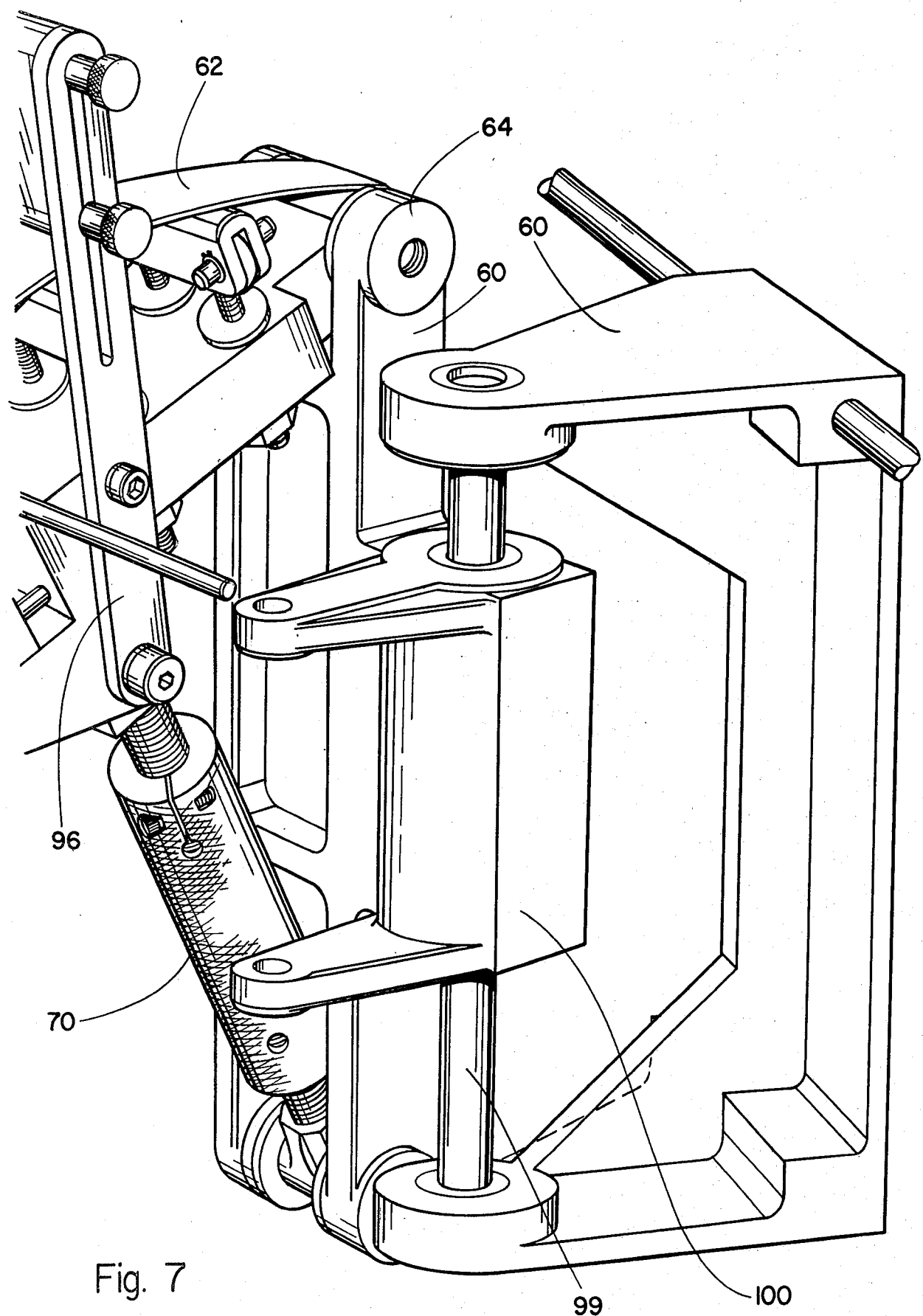
FIG. 7 is a view in perspective of the mounting assembly for the embodiment illustrated in FIG. 5.

FIGS. 5, 6 and 7 illustrate in detail the bending form itself which embodies the present invention. The preferred embodiment illustrated in FIGS. 5–7 has a support member 60 and an elongated, flexible, preferably resilient spring steel sheet 62 having one surface, the upper surface in the preferred embodiment, defining the form surface against which the coil is pulled and bent to appropriately shape it. A pair of spaced end supports 64 and 66 are attached to the opposite ends of the flexible sheet 62. The end support 66 is angularly adjustable relative to the end support 64 to permit its end of the flexible sheet 62 to be twisted with respect to the other end and for being adjustably fixed to support the sheet 62 rigidly in position with the selected twist. As an alternative, the end support 64 can also be made angularly adjustable. FIG. 5 illustrates a relatively simple curvature with no twists while FIG. 6 illustrates a more complex curvature with significant twist.

Preferably, the angularly adjustable end support 66 is mounted near the end of a pivot arm 68 which is pivotally secured to the support member 64 at the pivot axis of the end support 64. The angular orientation of the pivot arm 68 may be adjusted by means of the turnbuckle 70 to a selected angular position relative to the support member 60. In this manner the position of the end support 66 is made adjustable transversely of the flexible sheet 62, that is in the preferred embodiment adjustable up and down at greater or lower heights to permit adjustment of the inclination of the flexible form sheet 62.

Preferably the end support 66 is also mounted on a sliding carriage which slides on pins 72 and 74 along the longitudinal axis of the pivot arm 68 so that the distance from the end support 64 to the end support 66 may also be adjustably varied. Therefore, it can be seen that pivotal movement of the end support 66 varies the twist of the flexible sheet 62 while longitudinal adjustment of the end support 66 adjustably increases or decreases its curvature.

In order to facilitate the bending and adjustment of the curvature of the flexible form sheet 62, its opposite ends are preferably pivotally connected to the end supports 64 and 66 so that the ends can pivot about the lateral axes 80 and 82 of the end supports. This is most simply accomplished by bending the ends of the flexible sheet 62 loosely around the lateral, cylindrically shaped portion of the end supports so that each end may slideably pivot about the lateral axis of its end support.

Positioned intermediate the end supports 64 and 66 are intermediate supports 84 and 86. These intermediate supports 84 and 86 support the flexible sheet 62 between its ends.

Each of the intermediate supports is mounted so that it can be adjusted transversely of the sheets which, in the preferred orientation, is in the up and down direction with respect to the pivot arm 68. They can also be adjusted angularly of the sheet as illustrated with the different angular adjustments of FIGS. 5 and 6. The intermediate supports therefore support the form sheet 62 at a selected height and twist.

The intermediate supports are preferably identically constructed. For example, the intermediate support 84 has a pair of threaded rods 88 and 90 which are threadedly engaged to nut members 92 and 94 which in turn are rotatably secured to the pivot arm 68 so that the threaded rods can each be independently raised and lowered with respect to the pivot arm 68. A crossbar 96 is pivotally connected to the threaded rods 88 and 90 distally from the pivot arm and engages the flexible sheet 62.

An upstanding arm 98 is mounted for vertical adjustment or transverse adjustment with respect to the forming surface of form sheet 62. It provides a hold down for the coil.

The bending form of FIGS. 5, 6 and 7 may of course be modified in a variety of alternative ways without departing from the present invention.

For example, the pivot arm 68 may be made substantially longer and additional intermediate supports, such as intermediate supports 84 and 86, may be spaced along the lengthened pivot arm. The bending form may be supplied in models having a variety of different lengths in order to conveniently accomodate coils having end turn portions of different lengths.

One advantage of utilizing spring steel as the form sheet 62 is that, although it can be bent and twisted into a variety of shapes, it is difficult to bend beyond its elastic limit. It is desirable not to bend the form sheet beyond the elastic limit because the relatively softer coil bent over the form should also not be bent beyond its elastic limit.

The bending form of the present invention is advantageously mounted to the coil spreading machine by means of a rod 99 extending through an outstanding hinge member 100 as illustrated in FIG. 7.

Referring to FIG. 3 the bending forms 52 and 56 illustrated in FIG. 3 are mounted to rods which are aligned along the same vertical axis. The bending form 52 is mounted lower than the bending form 54. The outstanding hinge portion on the bending form 56 may extend in the opposite direction from that illustrated in FIG. 7. Both bending forms are pivotal about this axis as illustrated in FIG. 2. In this manner they can be pivoted to accomodate both short, stubby end turns as well as elongated, relatively pointy end turns. The upper bending forms may have a different contour than the lower bending forms because the upper end turn portions 21 and 22 may have substantially different contours than the lower end turn portions 20 and 23.

The bending forms each may be additionally provided with hydraulic cylinders for translating them along a vertical axis as well as additional hydraulic cylinders for pivoting them.

The use of the bending form of the present invention begins with a determination of the curvature or contour of the end turn portions. This can be done utilizing drawings if the drawings are available or by the fabrication of a template. Additionally, the various adjustments described above may be accomplished under machine control by providing a motive power means such as hydraulic cylinders for making these adjustments.

The information defining the end turn curvature may be converted to an algorithm or digital data to enable computerized positioning of the twist and curvature of the form surface 62 and all other form surfaces of the bending forms embodying the present invention.

After the bending forms are adjusted to give the desired twist and curvature, they may be positioned appropriately below the coil to be bent.

In the operation of one type of machine, the clamps 32, 34, 36 and 38 spread the coil and then the clamps 34 and 38 pull downwardly to pull the coil end portions firmly against the bending forms 52 and 56 to form them into the desired contour.

If desired for forming some types of end turns, the bending forms may themselves by hydraulically driven upwardly against the coil to also aid in the bending.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An adjustable bending form comprising:
   (a) an elongated flexible sheet having one surface defining the form surface;
   (b) spaced end supports mounted on a frame and attached near the ends of said sheet, said end supports being adjustably spaced for imparting a selected arch in said one surface, at least one of said end supports also being angularly adjustable relative to the other end support about a pivot axis disposed generally in the direction of a line extending between said spaced end supports for imparting a twist in said sheet and for supporting said sheet with the selected twist; and
   (c) intermediate supports mounted on said frame for supporting said sheet intermediate its ends, said intermediate supports being angularly adjustable about a pivot axis disposed generally in the direction of a line extending between said end supports for supporting said sheet at said selected arch and said selected twist.

2. A bending form in accordance with claim 1 wherein the angularly adjustable end support is also adjustable transversely of said sheet.

3. A bending form in accordance with claim 1 wherein said sheet is a resilient flexible sheet and wherein said sheet is pivotally connected to said end supports to permit pivotal movement of said sheet relative to the lateral axis of each of said end supports.

4. An adjustable bending form comprising:
   (a) a support member;
   (b) a pivot arm hingedly mounted near a first one of its ends to said support member and adjustable to a selected angular position relative to said support member;
   (c) a first end support formed near said first end of said pivot arm;
   (d) a second end support mounted to the other end of said pivot arm and angularly adjustable about a pivot axis disposed generally in a direction of a line extending between said end supports;
   and
   (e) an elongated, flexible resilient sheet capable of extending in an arch from said first end support to said second end support by moving said first and second end supports relative each other and being pivotally mounted to said end supports with respect to a lateral axis extending transverse to said line and capable of being twisted about said arch when said second end support is angularly adjusted.

5. A bending form in accordance with claim 4 wherein a plurality of intermediate supports are mounted to said pivot arm and adjustably extend against said flexible sheet, each of said supports being adjustable about a pivot axis disposed generally in the direction of a line extending between said end supports for supporting said sheet at said selected arch and said selected twist.

6. An adjustable bending form comprising:
   (a) a support member;
   (b) a pivot arm having a longitudinal axis hingedly mounted near a first one of its ends to said support member and adjustable to a selected angular position relative to said support member;
   (c) a first end support formed near said first end of said pivot arm;
   (d) a second end support mounted to the other end of said pivot arm and angularly adjustable about a longitudinal axis of said arm;
   (e) an elongated, flexible resilient sheet extending from said first end support to said second end support and being pivotally mounted to said end supports with respect to a lateral axis extending transverse to the longitudinal axis of said arm, said second end support being capable of establishing a twist in said sheet;
   (f) a plurality of intermediate supports mounted to said pivot arm and extend against said flexible sheet, each of said supports being adjustable transversely of said arm to a selected distance from said arm and each support being angularly adjustable to seat against said sheet when said sheet has a selected twist;
   (g) a pair of rods in each of said intermediate supports spaced laterally with respect to said elongated flexible sheet, said rods being threadedly engaged to nut members for adjustably securing said rods to said pivot arm; and (h) a cross bar in each of said intermediate supports pivotally connected to each threaded rod distally from said pivot arm for engaging said flexible sheet.

7. A bending form in accordance with claim 6 wherein said second end support is mounted to said pivot arm for longitudinal adjustment of its distance from said first end support.

8. A bending in accordance with claim 7 further comprising a second bending form also constructed in accordance with claim 8, said bending forms extending in generally opposing directions and pivotally mounted to a frame, each angularly adjustable within a range of arc.

9. A bending form in accordance with claim 8 wherein said flexible sheet comprises a sheet of spring steel.

* * * * *